3,050,569
RECLAIMING OF POLYMER FROM CLAY USED IN QUENCHING POLYMERIZATION CATALYST
Neville Leverne Cull, Baker, and Merlan Meredith Lambert, James Woodford Carr, Jr., and Peter Joseph Berkeley, Jr., Baton Rouge, La., assignors to Esso Research and Engineering Company, a corporation of Delaware
Filed Sept. 17, 1959, Ser. No. 840,634
4 Claims. (Cl. 260—669)

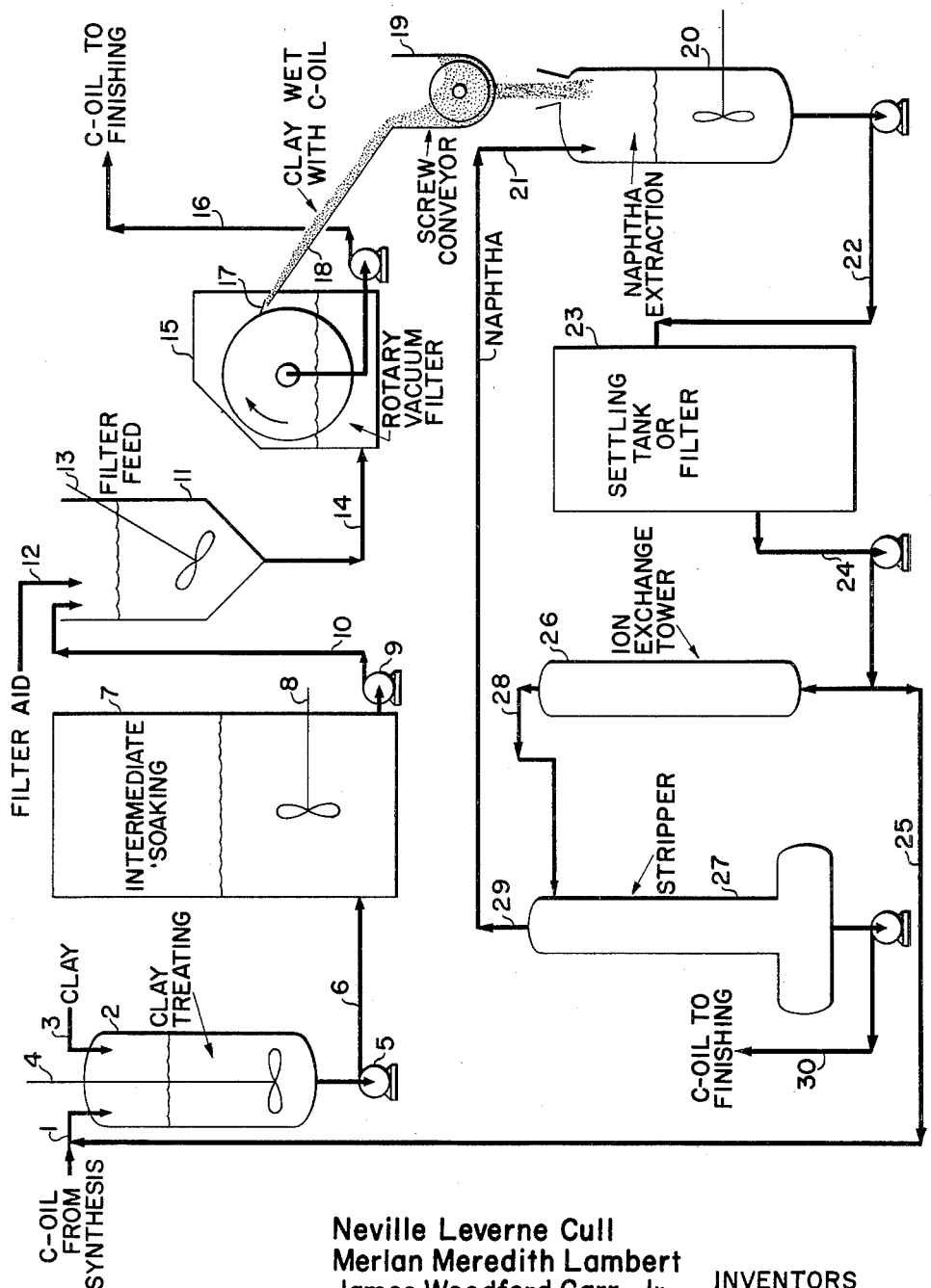

This invention relates to a method for separating alkali metal catalysts from diolefin polymers or copolymers and relates more particularly to a method for reclaiming polymer or copolymer from clay used in separating the alkali metal catalyst from the polymer or copolymer.

In accordance with the teachings of U.S. Patent No. 2,862,982 to Cull et al., it is known that alkali metal catalysts, for example, sodium, can be removed from polymers of diolefins such as butadiene or copolymers of butadiene and styrene which have been prepared in the presence of these catalysts by contacting the polymer with clay containing 1 to 25% bound water. The clay is then separated from the polymer by filtration. Unfortunately, however, considerable amounts of polymer are adsorbed on the clay and are lost. The actual amount remaining on the clay depends upon the amount of clay used, the dryness of the filter cake and other factors, but even under the most advantageous conditions the amount lost is significant.

In accordance with this invention, it has been found that the polymer adsorbed on the clay can be recovered by extracting it with a light hydrocarbon such as hexane, heptane, octane or a light naphtha fraction boiling 30°–200° C. under short contact times not exceeding ½ hr., e.g., ¼ to ½ hr.

The invention is particularly applicable to the preparation of drying oils by the polymerization of butadiene or the copolymerization of butadiene-styrene mixtures. In accordance with this process 60 to 100 parts by weight of a diolefin, such as butadiene-1,3 are copolymerized with 0 to 40 parts by weight of a vinyl aromatic hydrocarbon, such as styrene or its homologs, such as methyl or ethyl styrene, in the presence of 0.5 to 10 parts by weight (based on monomers) of an alkali metal catalyst, such as sodium, potassium, lithium, calcium, or rubidium. The polymerization is carried out in a reaction diluent at a temperature ranging from 25° to 105° C., preferably between 40° and 85° C., either batchwise or in a continuous process. Materials used as diluents in the polymerization are inert hydrocarbons which remain liquid under the reaction conditions employed. Diluents boiling between −15° and 200° C. are therefore suitable, since a slight pressure can be imposed upon the reaction zone when the low boiling diluents are employed. The diluents are used in amounts ranging from 50 to 500, preferably 200 to 300, parts per 100 parts of monomers. It is also desirable to employ about 10–40 parts of an ether promoter per 100 parts of monomers, and they may be used in addition to or instead of the hydrocarbon diluent. The use of the ethers is highly desirable since they improve the reproducibility of the process, shorten the induction period, and are particularly effective in producing a substantially colorless product. Particularly suitable ethers are dioxane when a batch process is used and diethyl ether when a continuous process is used. However, the ethers may be used interchangeably in either of these methods. It is also desirable to include 1 to 35 parts by weight, based on the catalyst, of an alcohol in the recipe to activate the catalyst. Suitable alcohols include methanol, isopropanol, normal pentanol and the like.

Liquid products obtained by the above process are passed through a filter or column containing an acid clay, such as Attapulgus clay or the like, in order to remove the catalyst and metallo-organic compounds. Alternatively the effluent from the polymerization reaction is mixed with the clay by agitation, allowing sufficient time for neutralization of the catalyst. The polymer-clay mixture is filtered, e.g., through a rotary type filter. The water content of the clay should be between 1 and 25% by weight, preferably between 10 and 20% and should be firmly bound therein. Alternatively acid-treated clay can be used, in which case the moisture content must not be over 1.5 to 2% in order to avoid imparting a yellow color to the final product.

Spent clay used in the above neutralization process still retains a considerable amount of polymer adsorbed thereon, totaling about 5 to 15% of the total product sent through the filter. In accordance with the present invention, the clay is washed with a hydrocarbon solvent, for example, pentane, hexane, heptane, octane, benzene, toluene, or naphtha boiling 30°–200° C. The hydrocarbon extract is then recycled back to the clay-treating stage.

Referring now to the drawing, liquid polybutadiene or a copolymer of butadiene and styrene prepared as described above and containing unreacted sodium and metallo-organic reaction products of sodium is introduced through line 1 into clay-treating vessel 2. Attapulgus clay containing 10–20% bound water in an amount sufficient to neutralize the sodium and to adsorb the alkali-metal organic derivatives is added to vessel 2 through line 3. The mixture is agitated by stirrer 4 and passed by pump 5 and line 6 to soaking vessel 7 where the mixture is allowed to stand for a sufficient length of time to complete the removal of the sodium and organo-sodium compounds from the polymer. Mild agitation can be given the contents of this vessel by agitator 8. After the removal of the sodium and organo-sodium compounds from the oil is complete, the mixture is passed by pump 9 and line 10 to filter feed tank 11 where a filter aid, such as celite, is added to the polymer-clay mixture by line 12. The contents of tank 11 are kept from settling by means of agitator 13. Filter feed tank 11 feeds by line 14 into rotary vacuum filter 15 from which a solution of polymer free of sodium and organo-sodium compounds is removed through line 16. Spent filter cake is removed by doctor blade 17 and passes by chute 18 to screw conveyor 19 by which it is passed to extraction drum 20. In this drum the clay containing adsorbed polymer as well as sodium and organo-sodium compounds is agitated with naphtha introduced through line 21. Proper conditions should be maintained in this drum so that a maximum amount of polymer and a minimum amount of sodium and organo-sodium compounds are removed from the clay. It is one of the features of this invention that the amount of sodium and organo-sodium compounds can be maintained less than 100 p.p.m. by the use of contact times of ¼ to ½ hr. Temperatures may be between 80° and 150° C. and diluent concentrations between 50 and 66%. After the requisite contact time in the extraction drum 20, the naphtha-clay mixture is passed by line 22 to clay separating unit 23 which may conveniently be a settling tank or may be a conventional type 3 filter. In any case, the naphtha extract is separated from the clay and is removed through line 24 and recycled through line 25 to the clay treating drum 2. Alternatively, however, the naphtha may be passed through ion exchange tower 26 where the sodium and organo-sodium compounds are removed. The naphtha passes from tower 26 to stripping zone 27 by line 28 where the naphtha is separated from the polymer and recycled by line 29 to naphtha extraction zone 20.

Sodium-free polymer recovered from the clay is removed through line 30.

The following example is given to further illustrate the invention.

*Example 1*

A butadiene-styrene drying oil was prepared from the following charge:

| | Parts |
|---|---|
| Butadiene-1,3 | 80 |
| Styrene | 20 |
| Dioxane | 40 |
| Varsol (B.P. 150°–200° C.) | 200 |
| Isopropanol | 0.2 |
| Sodium (10–50 microns) | [1] 1.5 |
| Temperature 50° C. | |

[1] Based on monomers.

The crude reaction product was filtered through Attapulgus clay containing about 20% moisture. The clay was then repuddled with a solvent consisting of 15 vol. percent dioxane and 85 vol. percent naphtha boiling 150°–200° C. under different conditions of time, temperature, and diluent concentration. The following data were obtained:

| Wt. Percent Diluent | 50% | | 66% | |
|---|---|---|---|---|
| Temperature, °C | 80 | 150 | 80 | 150 |
| P.p.m. Na After Indicated Agitation: | | | | |
| 1 Hour | 7 | 370 | 20 | 180 |
| ½ Hour | 0 | 32 | 7 | 20 |

The above results show that low temperature, short agitation, and low diluent concentration are desirable. However, high diluent concentration and high temperature are preferred since these give higher filter rates and higher polymer recovery. The data show that the amount of sodium and sodium compounds removed from the clay can be held below 50 p.p.m. even at high diluent concentration and high temperature provided the time of contact does not exceed ½ hr. Since a short contact time is necessary, the solvent should be in contact with the clay for at least ¼ hr.

The nature of the present invention having been thus fully set forth and specific examples of the same given, what is claimed as new and desired to be secured by Letters Patent is:

1. In a process for removing alkali metal and organo-alkali metal derivatives from a liquid hydrocarbon polymer of a $C_4$ to $C_6$ conjugated diolefin containing them, by contacting said polymer with an acid clay containing 1–25% by weight of bound water and filtering and in which a spent clay is obtained containing the alkali metal, organo-alkali metal derivatives and polymer adsorbed thereon, the method for recovering maximum polymer with minimum alkali metal and organo-alkali metal derivatives which comprises; extracting the spent clay with 50–66% of a hydrocarbon solvent (based on clay) selected from the group consisting of hexane, heptane, octane and a light naphtha fraction boiling between 30°–200° C., at a temeprature between 80° and 150° C. and for a contact time of ¼ to ½ hr. to obtain a recovered polymer phase containing less than 100 p.p.m., based on recovered polymer, of an alkali metal and organic alkali metal derivatives to provide recovered polymer with recovered alkali metal and organo-alkali metal derivatives therein being less than 100 p.p.m. based upon said recovered polymer.

2. The process according to claim 1 in which the polymer is the homopolymer of butadiene.

3. Process according to claim 1 in which the polymer is the copolymer of butadiene with styrene.

4. In a process for removing sodium and organo-sodium derivatives from a liquid hydrocarbon polymer of butadiene with styrene containing them, by contacting said polymer with Attapulgus clay containing 1–25% by weight of bound water and filtering and in which a spent clay is obtained containing the sodium, organo-sodium derivatives and polymer adsorbed thereon; the method for recovering maximum polymer with minimum sodium and organo-sodium derivatives which comprises; extracting the spent clay with 50–66% of a hydrocarbon solvent mixture (based on clay) of naphtha boiling between 150°–200° C., and dioxane at a temperature between 80° and 150° C. and for a contact time of ¼ to ½ hr. to obtain a recovered polymer phase containing less than 50 p.p.m., based upon recovered polymer, of sodium and organo-sodium derivatives to provide recovered polymer with recovered sodium and organo-sodium derivatives being less than 50 p.p.m. based upon said recovered polymer.

References Cited in the file of this patent

UNITED STATES PATENTS

| 1,827,165 | Pfaff et al. | Oct. 13, 1931 |
| 1,915,433 | Mann et al. | June 27, 1933 |
| 2,316,005 | Lachle | Apr. 6, 1943 |
| 2,709,674 | Bergstrom | May 31, 1955 |
| 2,847,485 | Fear | Aug. 12, 1958 |
| 2,862,982 | Cull et al. | Dec. 2, 1958 |